US005886952A

United States Patent [19]

White

[11] Patent Number: 5,886,952

[45] Date of Patent: Mar. 23, 1999

[54] ALARM CLOCK REMOTE CONTROL SYSTEM

[76] Inventor: Lucious White, 120 Hobart Ave., Syracuse, N.Y. 13205

[21] Appl. No.: 832,904

[22] Filed: Apr. 3, 1997

[51] Int. Cl.[6] .......................... G04B 47/00; G04B 23/02; G05B 19/02; H04B 1/06

[52] U.S. Cl. ........................ 368/10; 368/74; 340/825.69; 455/151.2; 455/353

[58] Field of Search .......................... 368/10, 12, 72–74, 368/185–187, 250, 251; 340/825.22, 825.69; 455/4.1, 151.1, 151.2, 171.1, 181.1, 352–355

[56] References Cited

U.S. PATENT DOCUMENTS

| | | | |
|---|---|---|---|
| 4,316,273 | 2/1982 | Jetter | 368/47 |
| 4,440,334 | 4/1984 | Kappel et al. | |
| 4,783,800 | 11/1988 | Levine | 368/10 |
| 4,825,200 | 4/1989 | Evans et al. | 341/23 |
| 5,056,070 | 10/1991 | Shibuya et al. | 368/10 |
| 5,287,109 | 2/1994 | Hesse | 341/176 |
| 5,365,494 | 11/1994 | Lynch | 368/10 |
| 5,483,689 | 1/1996 | O'Donnell, Sr. et al. | 455/206.1 |
| 5,677,895 | 10/1997 | Mankovitz | 368/10 |
| 5,705,997 | 1/1998 | Park | 540/82.649 |

OTHER PUBLICATIONS

Bose Owner Guide, Jan. 1995.

*Primary Examiner*—Vit Miska

[57] ABSTRACT

An Alarm Clock Remote Control System for assisting an individual in operating an alarm clock without requiring the individual to be removed from a bed. The device includes an encasement, a display within the encasement, a tether secured a swivel, a clamp secured to the tether, a light within the encasement and a keypad within the encasement for allowing programming of the alarm clock.

1 Claim, 3 Drawing Sheets

ALARM CLOCK REMOTE CONTROL SYSTEM

BACKGROUND OF THE INVENTION

1. Field of the Invention

The present invention relates to Alarm Clock Devices and more particularly pertains to a new Alarm Clock Remote Control System for assisting an individual in operating an alarm clock without requiring the individual to be removed from a bed.

2. Description of the Prior Art

The use of Alarm Clock Devices is known in the prior art. More specifically, Alarm Clock Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Alarm Clock Devices include U.S. Pat. No. 5,379,273; U.S. Pat. No. 4,316,273; U.S. Design Pat. No. 341,332; U.S. Design Pat. No. 354,959; U.S. Pat. No. 5,187,469; and U.S. Pat. No. 5,287,109.

While these devices fulfill their respective, particular objectives and requirements, the aforementioned patents do not disclose a new Alarm Clock Remote Control System. The inventive device includes an encasement, a display within the encasement, a tether secured a swivel, a clamp secured to the tether, a light within the encasement and a keypad within the encasement for allowing programming of the alarm clock.

In these respects, the Alarm Clock Remote Control System according to the present invention substantially departs from the conventional concepts and designs of the prior art, and in so doing provides an apparatus primarily developed for the purpose of assisting an individual in operating an alarm clock without requiring the individual to be removed from a bed.

SUMMARY OF THE INVENTION

In view of the foregoing disadvantages inherent in the known types of Alarm Clock Devices now present in the prior art, the present invention provides a new Alarm Clock Remote Control System construction wherein the same can be utilized for assisting an individual in operating an alarm clock without requiring the individual to be removed from a bed.

The general purpose of the present invention, which will be described subsequently in greater detail, is to provide a new Alarm Clock Remote Control System apparatus and method which has many of the advantages of the Alarm Clock Devices mentioned heretofore and many novel features that result in a new Alarm Clock Remote Control System which is not anticipated, rendered obvious, suggested, or even implied by any of the prior art Alarm Clock Devices, either alone or in any combination thereof.

To attain this, the present invention generally comprises an encasement, a display within the encasement, a tether secured a swivel, a clamp secured to the tether, a light within the encasement and a keypad within the encasement for allowing programming of the alarm clock.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new Alarm Clock Remote Control System apparatus and method which has many of the advantages of the Alarm Clock Devices mentioned heretofore and many novel features that result in a new Alarm Clock Remote Control System which is not anticipated, rendered obvious, suggested, or even implied by any of the prior art Alarm Clock Devices, either alone or in any combination thereof.

It is another object of the present invention to provide a new Alarm Clock Remote Control System which may be easily and efficiently manufactured and marketed.

It is a further object of the present invention to provide a new Alarm Clock Remote Control System which is of a durable and reliable construction.

An even further object of the present invention is to provide a new Alarm Clock Remote Control System which is susceptible of a low cost of manufacture with regard to both materials and labor, and which accordingly is then susceptible of low prices of sale to the consuming public, thereby making such Alarm Clock Remote Control System economically available to the buying public.

Still yet another object of the present invention is to provide a new Alarm Clock Remote Control System which provides in the apparatuses and methods of the prior art some of the advantages thereof, while simultaneously overcoming some of the disadvantages normally associated therewith.

Still another object of the present invention is to provide a new Alarm Clock Remote Control System for assisting an individual in operating an alarm clock without requiring the individual to be removed from a bed.

Yet another object of the present invention is to provide a new Alarm Clock Remote Control System which includes an encasement, a display within the encasement, a tether secured a swivel, a clamp secured to the tether, a light within the encasement and a keypad within the encasement for allowing programming of the alarm clock.

Still yet another object of the present invention is to provide a new Alarm Clock Remote Control System that allows an individual to locate the remote control easily during darkness.

Even still another object of the present invention is to provide a new Alarm Clock Remote Control System that is removably securable to the user's bed by the clamp.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
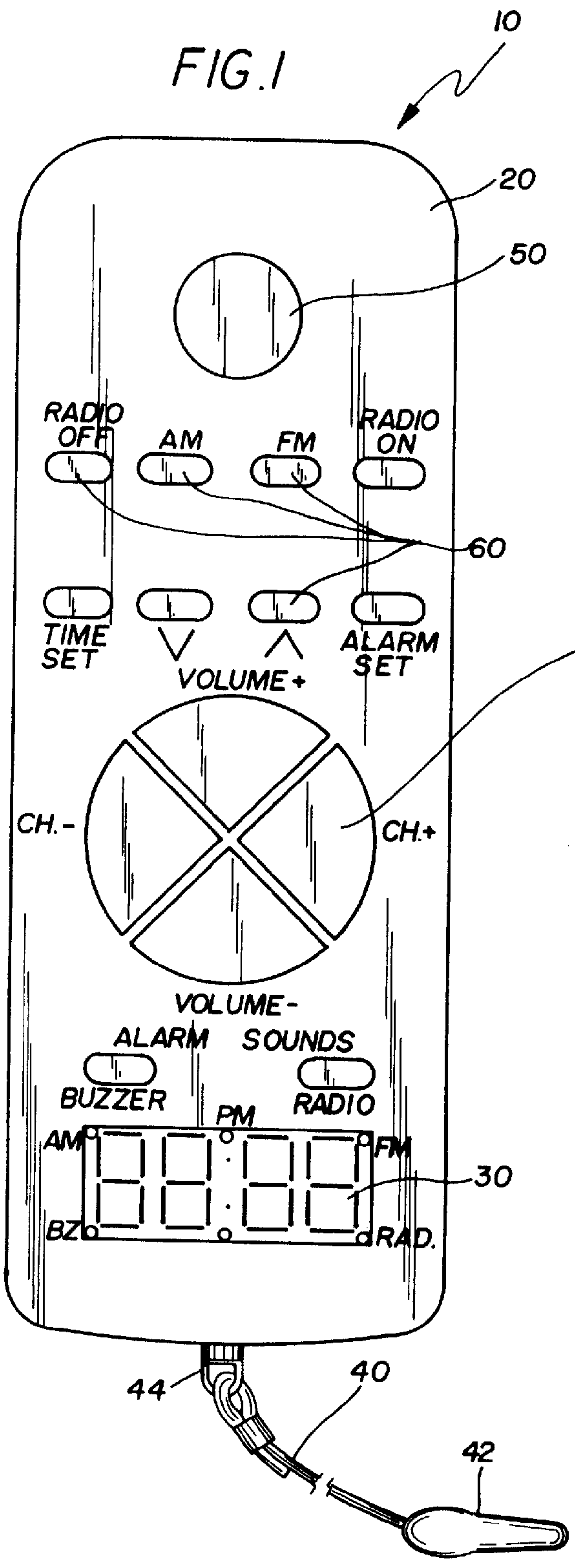
FIG. 1 is a top view of a new Alarm Clock Remote Control System according to the present invention.

With reference now to the drawings, and in particular to FIGS. 1 through 6 thereof, a new Alarm Clock Remote Control System embodying the principles and concepts of the present invention and generally designated by the reference numeral 10 will be described.

As best illustrated in FIGS. 1 through 6, the Alarm Clock Remote Control System 10 comprises an encasement 20 substantially swaged shaped, a display 30 secured within the encasement 20 and electrically connected to a microcontroller, a keypad 60 secured within the encasement 20 and electrically connected to the microcontroller, and a transmitting means electrically connected to the microcontroller for transmitting a signal to a receiver within the alarm clock thereby allowing the user to control the alarm clock from within the bed.

Figure 2:
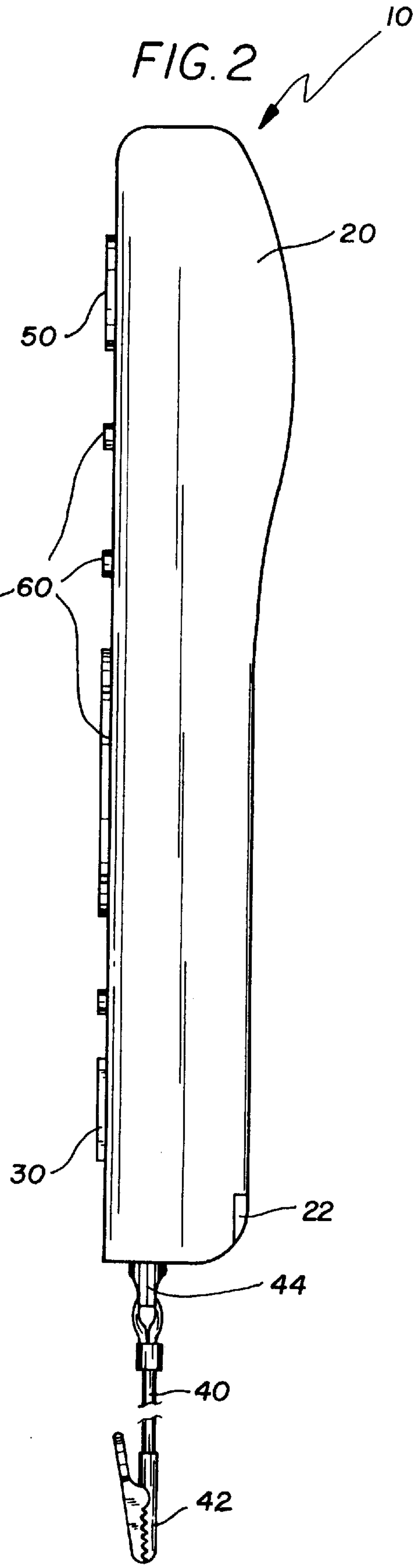
FIG. 2 is a side view of the present invention.
Figure 4:
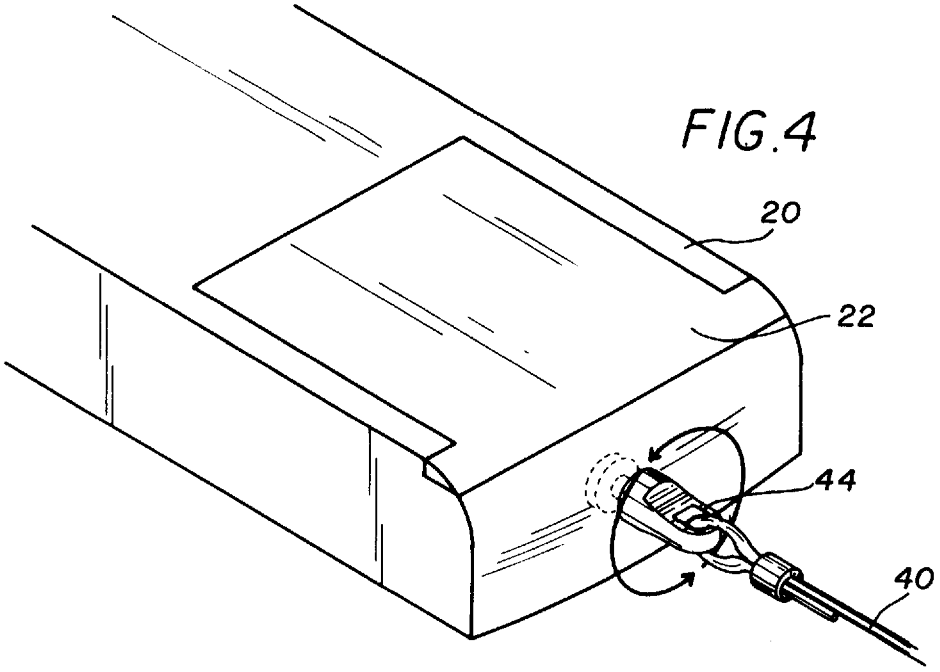
FIG. 4 is a magnified upper perspective view of the swivel and tether.

As shown in FIGS. 1 and 2 of the drawings, a light 50 is secured within the encasement 20 for providing illumination of the keypad 60 during darkness. As shown in FIGS. 1, 2 and 4 of the drawings, a swivel 44 is secured to an end of the encasement 20. A tether 40 is provided having a first end and a second end. The first end of the tether 40 is rotatably secured to the swivel 44. A clamp 42 is secured to the second end of the tether 40 for removably securing to an object such as the bed.

Figure 3:
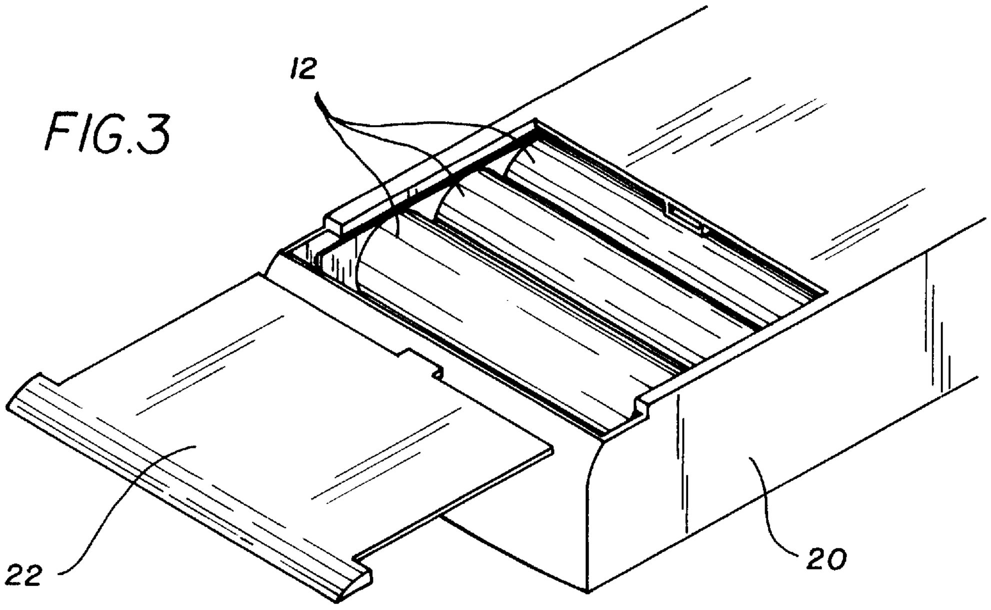
FIG. 3 is a magnified upper perspective view of the door covering the batteries.

As shown in FIGS. 2 through 4 of the drawings, the encasement 20 includes a door 22 removably enclosing a plurality of batteries 12 electrically connected to the microcontroller and the light 50.

Figure 5:
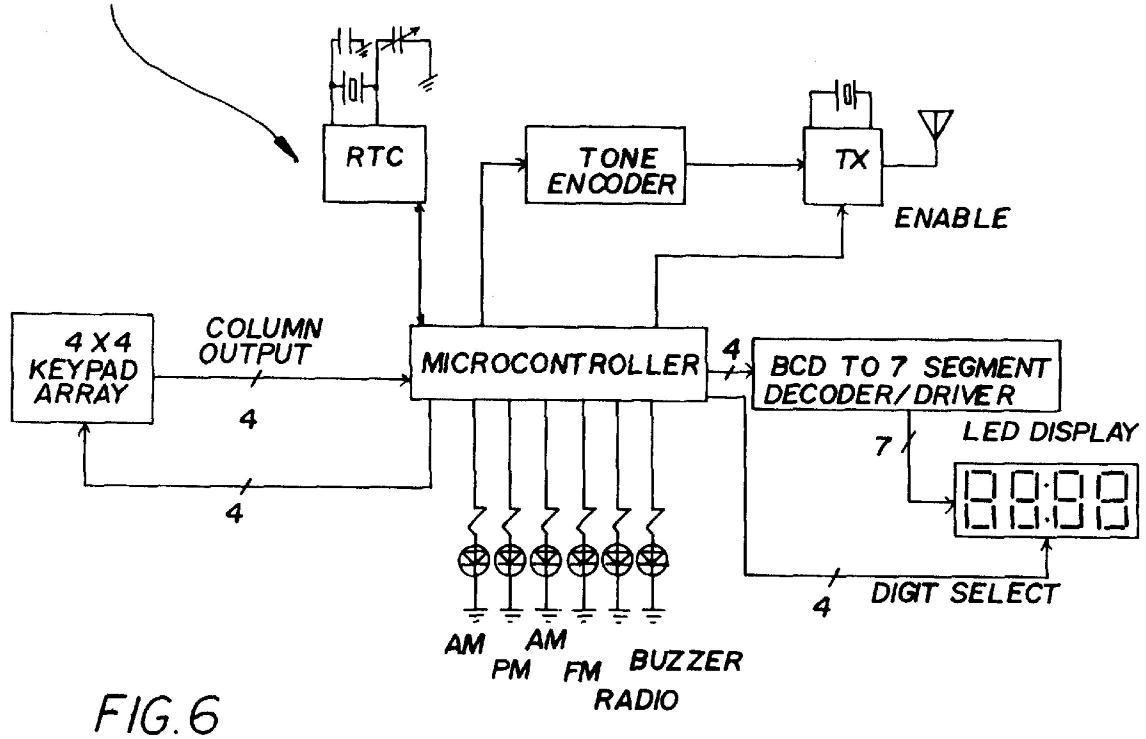
FIG. 5 is a schematic illustration of the present invention comprising conventional circuitry well known in the art.

FIG. 5 shows electrical circuitry for the remote control device within encasement 20. A real time clock RTC maintains current time. The circuit further includes a microcontroller, keypad, display and a transmitter TX for transmitting remote signals to a receiver in the alarm clock.

Figure 6:
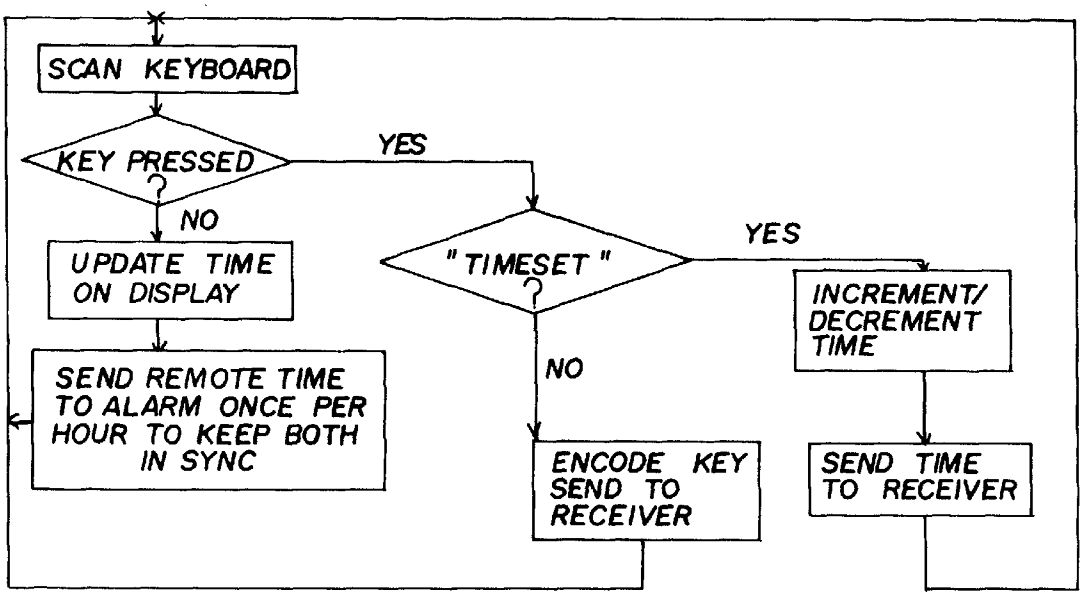
FIG. 6 is a flow chart of the present invention.

FIG. 6 illustrates a flow chart of the operation of the remote control device. As shown in the figure, a remote time signal is sent periodically from the remote control 20 to the alarm clock to update a time of the alarm clock if no key is depressed on the remote control 20. Multiple alarm functions, such as turning the radio and off, switching between am and fin radio reception, setting the time, turning the volume up and down, setting the alarm time and setting a preferred alarm sound are thus controlled with the remote control device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An alarm clock remote control system comprising:

an alarm clock;

an encasement, the encasement having a thicker portion proximate a forward edge of the encasement and a thinner portion proximate a rear edge of said encasement;

a LED display secured within said encasement and electrically connected to a microcontroller;

said microcontroller being adapted for controlling multiple functions of the alarm clock;

a keypad secured within said encasement and electrically connected to said microcontroller;

a transmitting means electrically connected to said microcontroller for transmitting a signal to a receiver within said alarm clock thereby allowing said user to control said alarm clock from within said bed;

a light within said encasement for providing illumination of said keypad during darkness;

a swivel rotatably secured to an end of said encasement;

a tether having a first end and a second end, said first end secured to said swivel;

an alligator clip secured to said second end of said tether for removably securing to an object such as said bed;

wherein said encasement includes a door removably enclosing a plurality of batteries electrically connected to said microcontroller and said light;

wherein a time is depicted on the display and a remote time signal is sent to the alarm clock periodically to update a time of the alarm clock upon the lack of depression of a key of the keypad;

wherein the multiple alarm clock functions include turning the radio on and off, switching between am and fm radio reception, setting the time, turning the volume up and down, setting the alarm time, and selecting a preferred alarm sound.

* * * * *